US011993979B2

(12) United States Patent
Martin

(10) Patent No.: US 11,993,979 B2
(45) Date of Patent: *May 28, 2024

(54) POCKET SLIDING SECURITY GATE

(71) Applicant: Rodney Hale Martin, Ponce de Leon, FL (US)

(72) Inventor: Rodney Hale Martin, Ponce de Leon, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/391,831

(22) Filed: Aug. 2, 2021

(65) Prior Publication Data

US 2022/0290488 A1 Sep. 15, 2022

Related U.S. Application Data

(63) Continuation of application No. 17/346,216, filed on Jun. 12, 2021, and a continuation of application No. 17/200,803, filed on Mar. 13, 2021, now Pat. No. 11,512,522.

(51) Int. Cl.

| | |
|---|---|
| ***E06B 9/04*** | (2006.01) |
| ***E05C 3/00*** | (2006.01) |
| ***E05D 15/06*** | (2006.01) |
| ***E06B 3/36*** | (2006.01) |
| ***E06B 3/46*** | (2006.01) |
| ***E06B 5/00*** | (2006.01) |

(Continued)

(52) U.S. Cl.

CPC ................ *E06B 9/04* (2013.01); *E05C 3/004* (2013.01); *E05D 15/0665* (2013.01); *E05D 15/0686* (2013.01); *E06B 3/36* (2013.01); *E06B 3/4654* (2013.01); *E06B 5/00* (2013.01); *E05Y 2201/684* (2013.01); *E05Y 2201/688* (2013.01); *E05Y 2900/40* (2013.01); *E06B 2009/002* (2013.01); *G08B 13/00* (2013.01)

(58) Field of Classification Search

CPC ............ E05D 15/0665; E05D 15/0686; E05D 15/0682; E06B 3/36; E06B 3/4654

USPC ............................................................ 49/323

See application file for complete search history.

(56) References Cited

U.S. PATENT DOCUMENTS 2,190,149 A * 2/1940 Coleman ............... E06B 3/4636 16/92

3,400,490 A * 9/1968 Anderson ............... E05D 15/06 49/504

(Continued)

FOREIGN PATENT DOCUMENTS

| | | | | |
|---|---|---|---|---|
| GB | 785817 A | * | 11/1957 | ......... E05D 15/0691 |
| GB | 2450984 A | * | 1/2009 | ......... E05B 15/0205 |
| WO | WO-9746769 A1 | * | 12/1997 | ........... E04B 2/7416 |

*Primary Examiner* — Marcus Menezes

(57) ABSTRACT

The invention relates to a sliding security gate inside a framed pocket unit. These Pocket Sliding Security Gates can be assembled and installed inside of the wall and positioned to close off rooms, hallways, and/or stairs for the protection of babies and toddlers, pets, and the disabled elderly. The Pocket Sliding Security Gate can be placed during construction where it can close across openings or hallways at the top or bottom of the stairs to provide safety and security to the vulnerable population listed above. In addition, this Pocket Sliding Security Gate also has an alarm attached to the end of the security gate so that when it opens, the alarm sounds to let the gatekeeper know that the security has been compromised.

1 Claim, 9 Drawing Sheets

(51) Int. Cl.
*E06B 9/00* (2006.01)
*G08B 13/00* (2006.01)

(56) References Cited

U.S. PATENT DOCUMENTS

| | | | | | |
|---|---|---|---|---|---|
| 3,993,988 | A * | 11/1976 | Walter | G08B 13/08 | 340/548 |
| 4,151,382 | A * | 4/1979 | Kaufman | G08B 13/08 | 200/61.81 |
| 4,161,850 | A * | 7/1979 | Peterson | E04B 2/82 | 52/239 |
| 4,227,766 | A * | 10/1980 | Finale | G08B 13/08 | 340/533 |
| 5,873,205 | A * | 2/1999 | Hanlon | E04B 2/7416 | 49/404 |
| 6,415,553 | B1 * | 7/2002 | Krayer, Jr. | E06B 3/4636 | 49/128 |
| 8,196,353 | B2 * | 6/2012 | Loidolt | E05D 15/0669 | 49/404 |
| 8,555,573 | B2 * | 10/2013 | Ellison | E06B 3/02 | 52/207 |
| 10,174,543 | B2 * | 1/2019 | Kapavik | E06B 9/04 | |
| 11,512,522 | B2 * | 11/2022 | Martin | E05D 15/0678 | |
| 11,519,209 | B2 * | 12/2022 | Terno | E05D 15/0665 | |
| 2004/0003556 | A1 * | 1/2004 | Zerbst | E04B 2/7422 | 52/239 |
| 2004/0148865 | A1 * | 8/2004 | Duncan | E05C 3/16 | 49/415 |
| 2006/0230684 | A1 * | 10/2006 | Poole | E05D 15/0634 | 49/409 |
| 2007/0166498 | A1 * | 7/2007 | Penar | E06B 1/6069 | 428/40.1 |
| 2009/0044916 | A1 * | 2/2009 | Singiser | E05D 15/0682 | 160/127 |
| 2012/0011789 | A1 * | 1/2012 | Henriott | E06B 3/46 | 52/239 |
| 2013/0081332 | A1 * | 4/2013 | Baumert | E06B 5/16 | 49/397 |
| 2018/0209192 | A1 * | 7/2018 | Selvaag | E05D 15/06 | |
| 2022/0290494 | A1 * | 9/2022 | Martin | E06B 3/36 | |
| 2022/0402612 | A1 * | 12/2022 | Davis | B64D 11/0602 | |

* cited by examiner 101
106

119

105
121

101
122
108
106
101
105

108
122
101
105

109
110
108
122

POCKET SLIDING SECURITY GATE

REFERENCE TO PENDING PRIOR PATENT APPLICATION

This patent application claims benefit of prior U.S. Nonprovisional Utility patent application Ser. No. 17/200,803, filed Mar. 13, 2021, by this inventor, Rodney H. Martin, for INTERIOR PRE-HUNG HINGED DOOR AND POCKET SLIDING SECURITY GATE, and U.S. Nonprovisional Utility patent application Ser. No. 17/346,216, filed Jun. 12, 2021, by this inventor, Rodney H. Martin, for REVERSIBLE SURFACE-MOUNTED SLIDING SECURITY GATE, which prior art is hereby incorporated herein by reference.

STATEMENT REGARDING FEDERALLY SPONSORED RESEARCH

Not Applicable

REFERENCE TO SEQUENCE LISTING

Not Applicable

FIELD OF INVENTION

The invention relates to a sliding security gate inside a pocket frame.

BACKGROUND OF THE INVENTION

Security gates are used for a number of different reasons. They are specifically designed to protect certain populations from entering into various environments that could be harmful and/or dangerous. Pet owners, parents of babies and small children, and people who take care of the disabled elderly use a wide variety of security gates to provide essential benefits for loved ones who are caring for these particular groups, including safety issues, training techniques, security reasons, protection from potential harm, and peace of mind knowing their loved ones are safe.

Security gates are made of an array of different materials, sizes, colors, and shapes. They are made of metal, plastic, wood, or composite. They can be permanently or temporarily mounted. All security gates are made for the same reason—to protect the safety and security of the population that it is intended to protect and to keep them out of harms way.

BRIEF SUMMARY OF THE INVENTION

The present invention relates to a wood frame pocket unit which houses a sliding security gate that opens and closes across an opening, hallway, and/or stairs. The Pocket Sliding Security Gate can be used to secure and isolate areas of the home. The Pocket Sliding Security Gate can be used like a half door and is installed as a wood framed pocket with a sliding security gate to provide safety and security to the vulnerable population listed above.

This sliding security gate secures the opening while still allowing for visual contact of the protected population, along with securely locking the gate on the opposite side of the pocket. In addition, this pocket sliding security gate has an attached alarm to it so when the gate becomes opened, the alarm goes off and alerts the gatekeepers that there is a security breach. This pocket sliding security gate is for new construction or for remodeling current structures.

In comparison to previous gates, the Pocket Sliding Security Gate has the following advantages:

a. The sliding gate has the advantages of being a simple and compact gate, easily operated, and when not in use, can be stowed away in the pocket.
b. There is no setting up and no preparation. The sliding gate is already installed in the pocket unit in the wall.
c. The sliding gate is made of durable material; i.e., metal, plastic, wood, or composite, whereby it is strong and does not break. It does not have to be replaced due to wear and tear of poor manufactured products that are not safe and not secure.
d. An additional feature of this pocket sliding gate is the attached alarm component that when the gate becomes opened the alarm goes off to indicate that the security of the gate has been breached.
e. The sliding gate can be securely locked/latched to the opposite side of the pocket opening so that it cannot be knocked over whereby injuries can be sustained. Although this sliding gate is strong and durable and latches to the lock and alarm receiver, the alarm feature is another safety and security component of this invention. It provides the gatekeeper peace of mind knowing that there is a dual security protection for the safety of their loved ones.
f. Lastly, when the gate is in the open position, it leaves the opening clear and free to pass through without obstructions.
g. This sliding security gate could be installed in new construction and/or remodeling application, as well as could be done as a single project to an already existing structure.

This sliding gate has the durability of being strong, secure, and safe for babies and toddlers, pets, and the disabled elderly. It is a permanent fixture inside the wall so that it does not have the tendency to break easily and is accessible to anyone who uses it. It is simple and easy to use and does not require a great deal of time in putting a sliding security gate across a particular door for the safety and security of the ones' it is intended to protect.

COMPONENT LIST

101—Wood Pocket Frame
104—Pass-Through Opening
105—Sliding Security Gate
106—1"×3" Wood Pocket Framing Member
108—Ball-Bearing Drawer Sliding Mechanism
109—Shim Pack
110—Dolly-Style Wheel
111—Openings Between the Vertical Slats of the Security Gate
**111*a***—Vertical Slats of the Security Gate
114—Battery-Operated Alarm
115—Right-Angle Latch
117—Plastic or Nylon Glides
119—Lock and Alarm Receiver
121—Pocket Sliding Security Gate
122—Removable Service Plate
123—2X Wall Framing
124—Drop-In Retainer Pin
125—Dry Wall

DETAILED DESCRIPTION OF THE INVENTION

Detailed illustrated embodiments of the present invention are disclosed herein.

Figure 1:
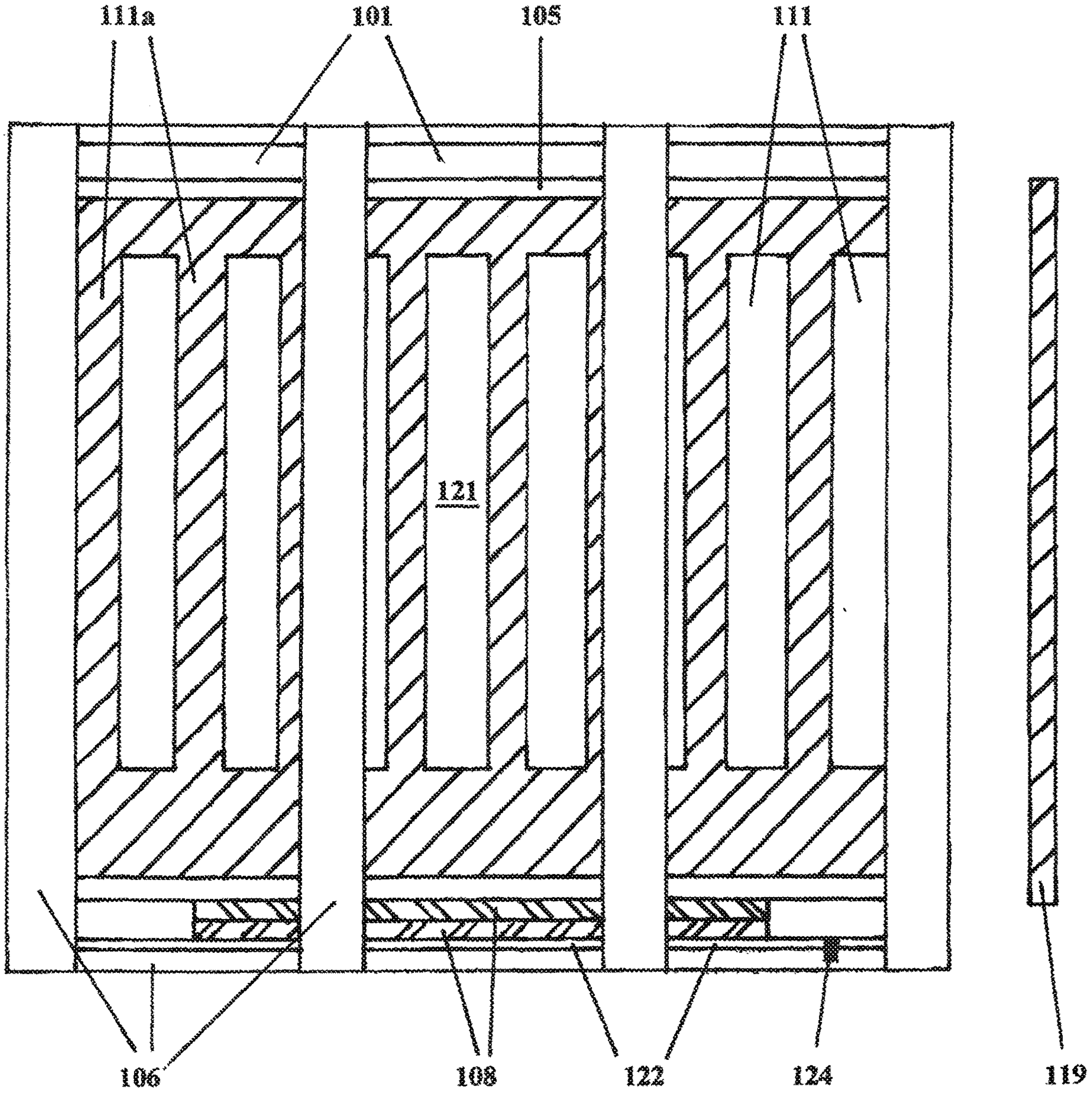
FIG. 1 shows the invention as it is—a sliding security gate put together with a pocket wood frame which houses the sliding security gate. To the right of the gate is the lock and alarm receiver.

FIG. 1 illustrates an elevation view of the invention, The Pocket Sliding Security Gate 121 as one whole unit. The sliding security gate 105 put together with the wood pocket frame 101 is the Pocket Sliding Security Gate 121. This invention is intended to be used in new construction structures, or used in remodeling projects, or could be installed in an existing home or business as a single improvement project. FIG. 1 shows the sliding security gate 105 in the open position inside the wood pocket frame 101 which is constructed with pine 1"×3" framing members 106. Adjacent to the pocket opening is where the lock and alarm receiver 119 would be located. When the sliding security gate 105 is in operation or in the closed position, it comes in contact with the lock and alarm receiver 119. You can use the right-angle latch 115 to lock the sliding security gate 105 and, if you choose, you can also activate the battery-operated alarm 114. When you decide to open the sliding security gate 105, you simply slide it back into the wood pocket frame 101 where it becomes hidden and out of the way leaving the pass-through opening 104 clear and free of obstructions that could cause a hazard. This sliding security gates' 105 simple design is for the purpose of illustration and has a perimeter frame with vertical slats **111*a* within the perimeter frame and equally spaced openings between the vertical slats 111. The sliding security gate shown here is one of many different designs and can be constructed of several different strong and sturdy materials. The back and forth or right to left motion is facilitated by the ball-bearing drawer slide mechanism 108**. This model has one stacked on top of the other for the purpose of achieving the travel distance needed to go from the open position to the closed position.

Figure 2:
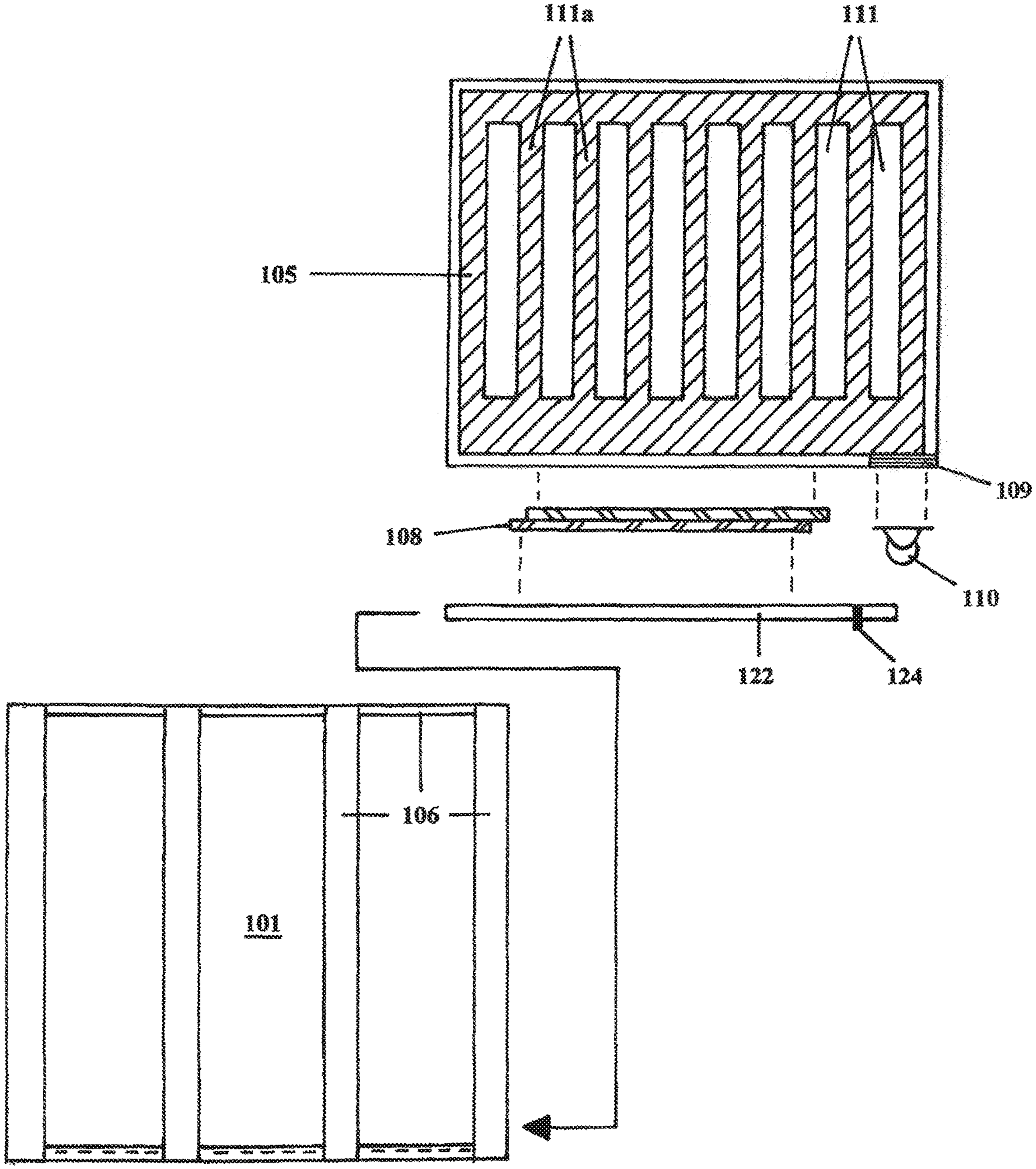
FIG. 2 shows the gate removed from the pocket wood frame and the separated parts.

FIG. 2 illustrates an exploded elevation view with the sliding security gate 105 removed from the wood pocket frame 101 made from 1"×3" pine wood pocket framing members 106. It also shows the other components separated from each other to show how it is assembled. The dolly-style wheel 110 mounts to the leading end of the sliding security gate 105 with the shim pack 109 in between the dolly-style wheel 110 and the bottom of the sliding security gate 105. The shim pack 109 creates the ability to adjust the dolly-style wheel 110 up or down depending upon the thickness of the finished floor. With reference to the ball-bearing drawer slide mechanism 108, it is mounted to both the top of the removable service plate 122 and the bottom of the sliding security gate 105. The removable service plate 122 has a metal drop-in retainer pin 124 mounted to the leading end. The drop-in retainer pin 124 serves as a position lock as it drops into a hole in the bottom plate of the wood pocket frame 101. The bottom plate has a channel cut into it for the removable service plate 122 to lay in.

Figures 3, 3A, 3B, 3C, 3D, 3E:
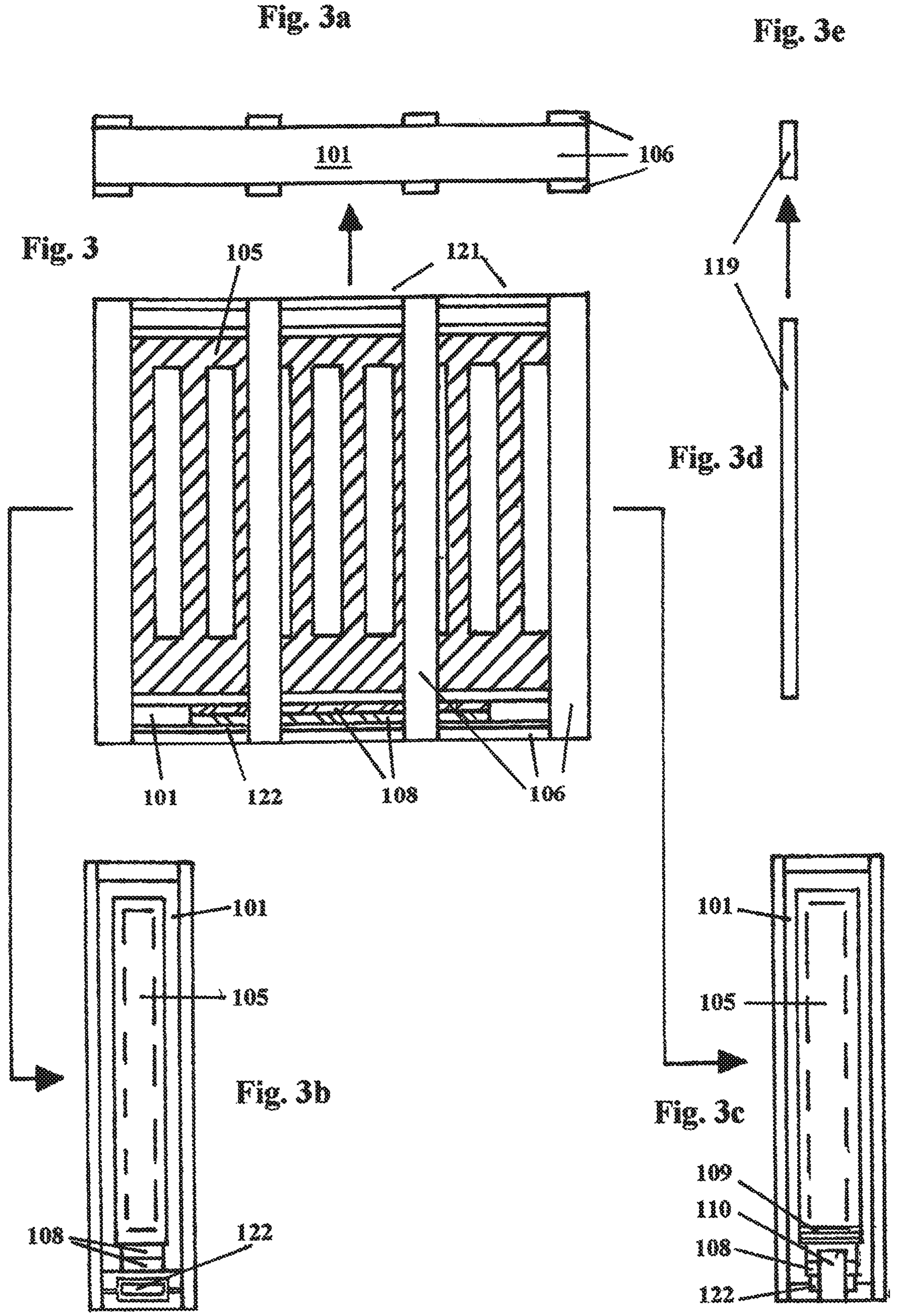
FIG. 3 shows an elevation view of the pocket sliding security gate.
FIG. 3*a* shows a top view of the pocket sliding security gate.
FIG. 3*b* shows the trailing end view of the pocket sliding security gate.
FIG. 3*c* shows the leading end view of the pocket sliding security gate.
FIG. 3*d* shows an end elevation view of the lock and alarm receiver.
FIG. 3*e* shows a top view of the lock and alarm receiver.

FIG. 3 illustrates the elevation view of the pocket sliding security gate 121 with the sliding security gate 105 inside the wood pocket frame 101.

FIG. 3*a* illustrates the top view of the pocket sliding security gate 121.

FIG. 3*b* illustrates the view of the pocket sliding security gate 121 end that is opposite where the sliding security gate 105 exits the wood pocket frame 101.

FIG. 3*c* illustrates the leading end view of the pocket sliding security gate 121 which is the end that the sliding security gate 105 exits the wood pocket frame 101.

FIG. 3*d* illustrates the side elevation view of the lock and alarm receiver 119. One half of the right-angle latch 115 is attached, along with one half of the battery-operated alarm 114 to the lock and alarm receiver 119, which is then mounted to the wall adjacent to the pocket sliding security gate 121.

FIG. 3*e* illustrates a top view of the lock and alarm receiver 119.

Figure 4:
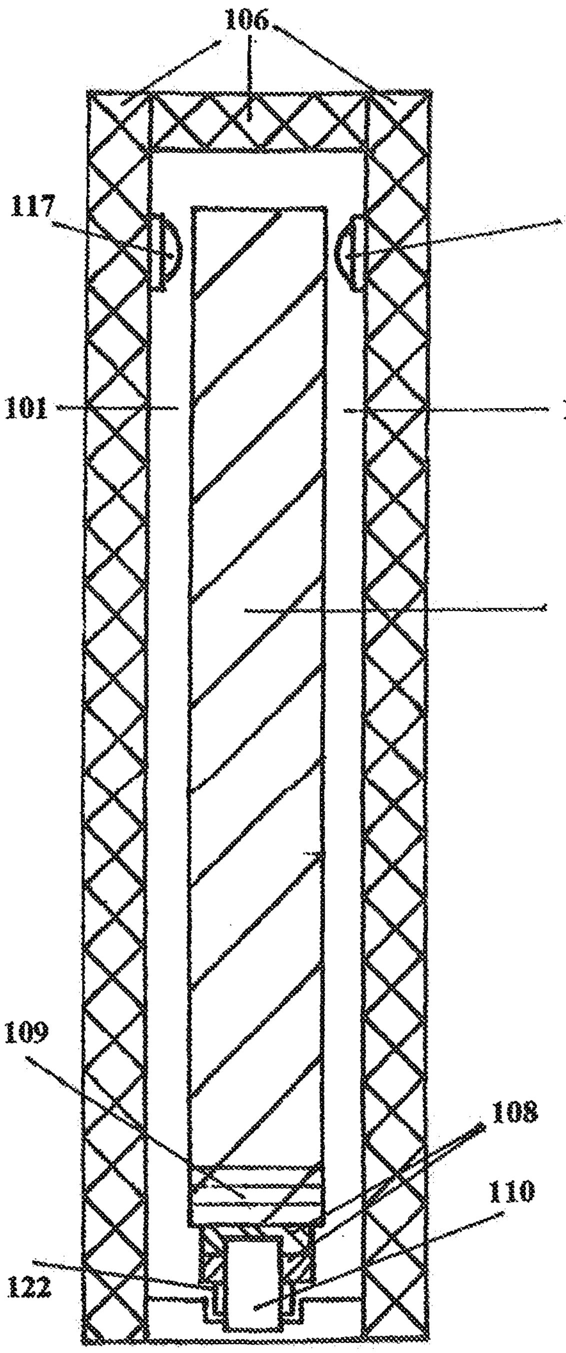
FIG. 4 shows an enlarged elevation view of the leading end of the pocket sliding security gate.

FIG. 4 illustrates an enlarged view of the leading end of the pocket sliding security gate 121. This view shows where the nylon glides are mounted to ensure the sliding security gate 105 slides in and out of the wood pocket frame 101 without getting caught on the wood framing member 106 as it travels back and forth in the upright position.

Figure 4A:
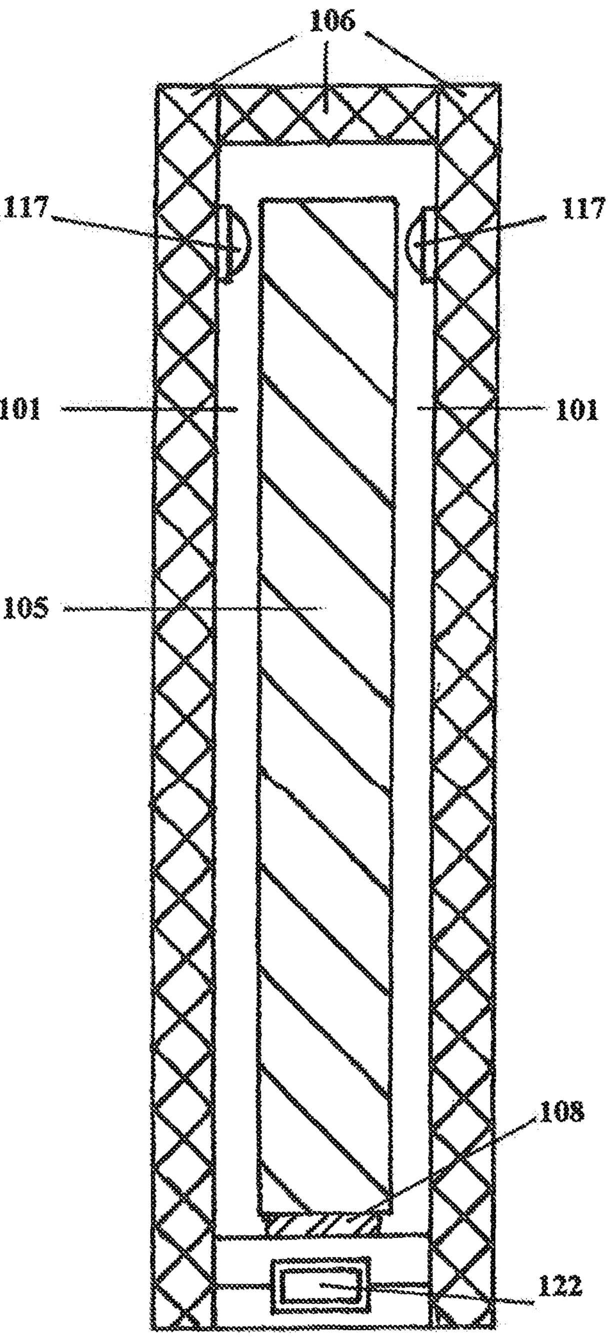
FIG. 4*a* shows an enlarged elevation view of the trailing or opposite end of the pocket sliding security gate.

FIG. 4*a* illustrates an enlarged view of the trailing end of the pocket sliding security gate 121. This view also shows the end of the removable service plate 122 and how it is cradled by the channel cut into the bottom plate.

Figure 5:
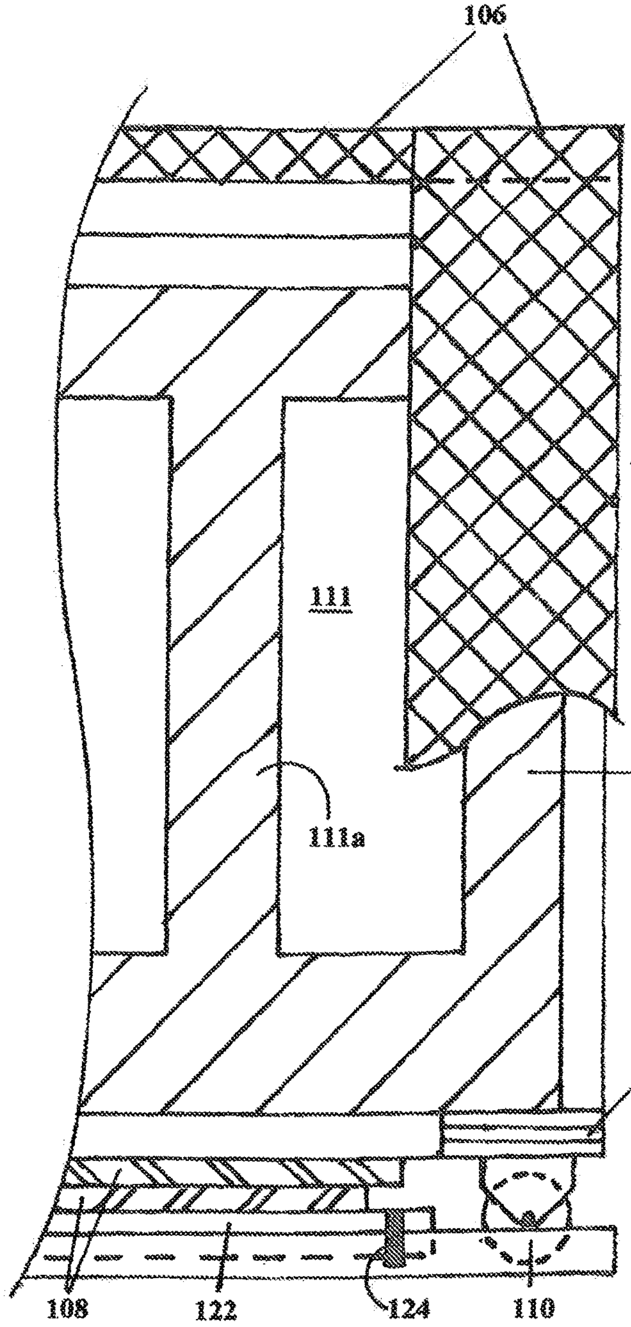
FIG. 5 shows an enlarged partial elevation side view of the leading end with part of the pocket frame cut away to better illustrate the components hidden behind it.

FIG. 5 illustrates a partial side elevation view of the pocket sliding security gate 121. It is enlarged to show better details of the components and their positioning. The leading end of the pocket sliding security gate 121 has a 1"×3" wood framing member 106 that is cut away because it hides the view of the dolly-style wheel 110 and the shim pack 109.

Figure 5A:
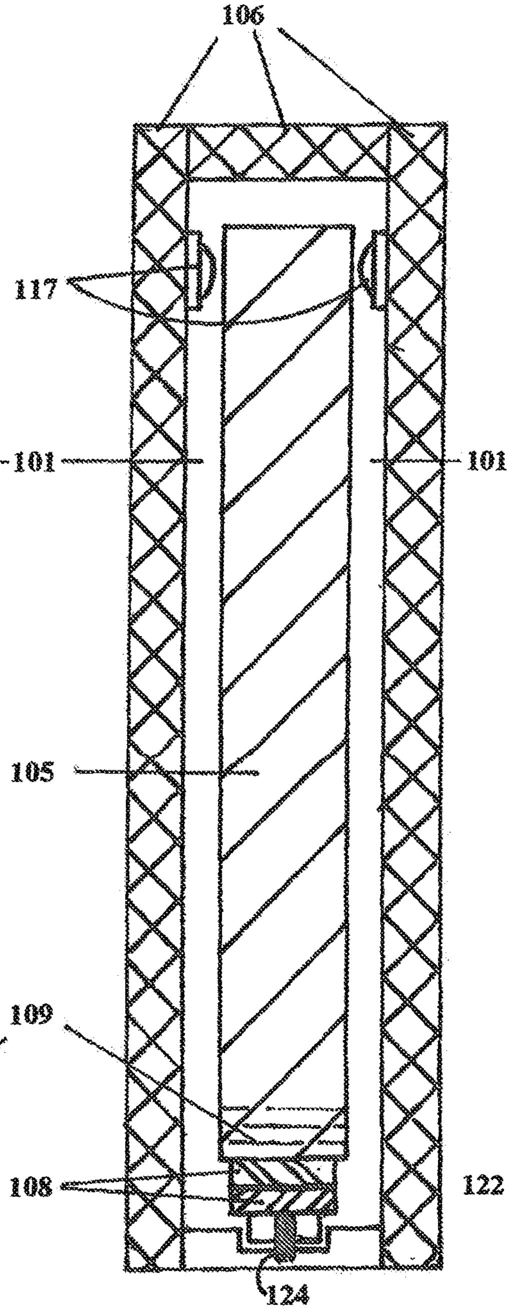
FIG. 5*a* shows an enlarged elevation leading end view with the wheel removed, again for a better understanding.

FIG. 5*a* illustrates an enlarged view of the leading end of the pocket sliding security gate 121. The dolly-style wheel 110 has been left out to show a different view of the drop-in retainer pin 124 and how it is fastened to the removable service plate 122 and how it drops into the hole in the bottom plate of the wood pocket frame 101.

Figure 6:
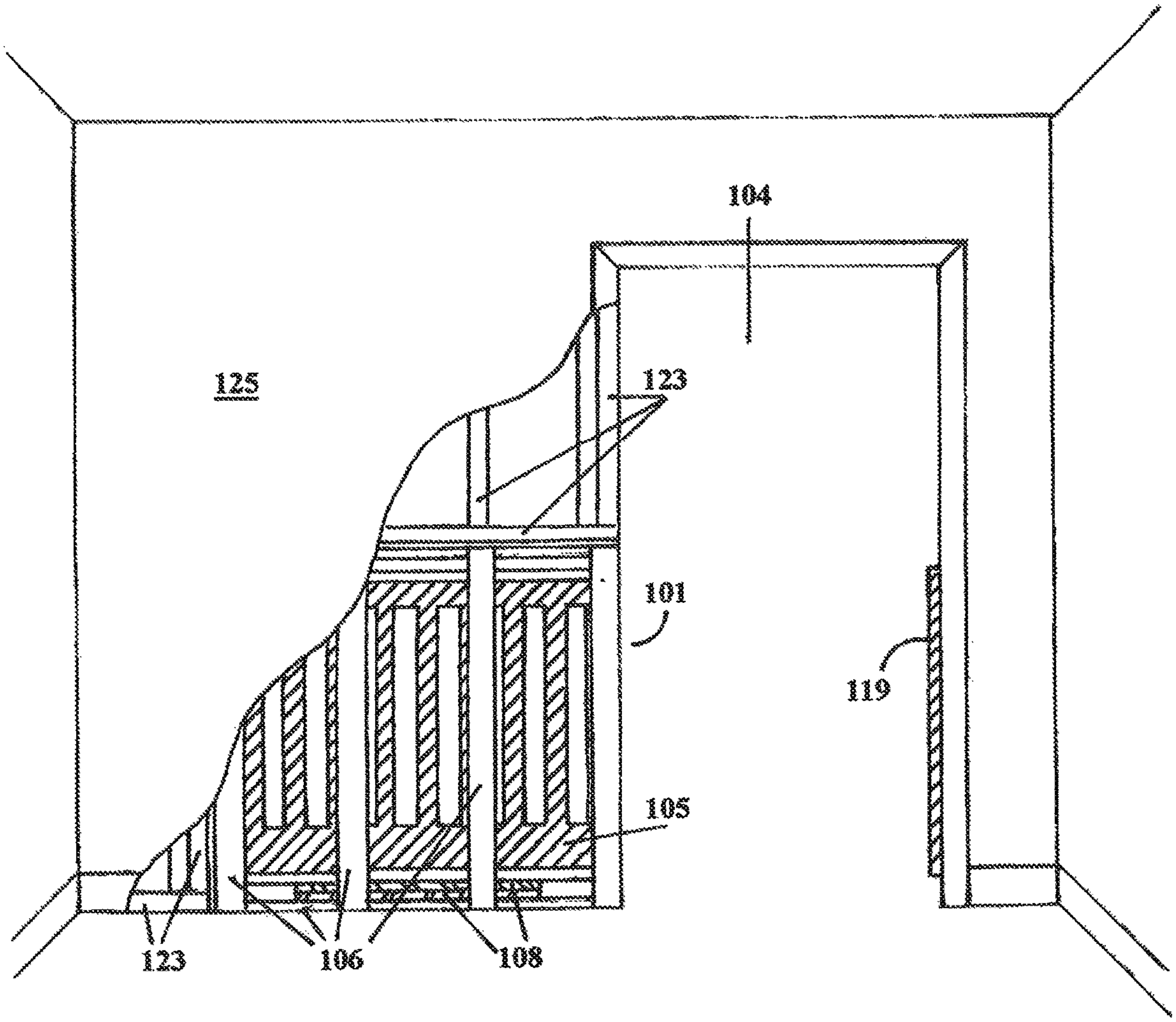
FIG. 6 shows an elevation view of a residential or business wall with the pocket sliding security gate installed in the wall next to an opening and part of the dry wall cut away so one can see the invention in the wall and in the open position.

FIG. 6 illustrates an elevation view of an interior wall of a home or business and it shows how it is mounted into the 2X wall framing 123 and the dry wall 125 with it cut away to show the 2X wall framing 123. This view is also showing the sliding security gate 105 stowed away in the open position inside the wood pocket frame 101.

Figure 7:
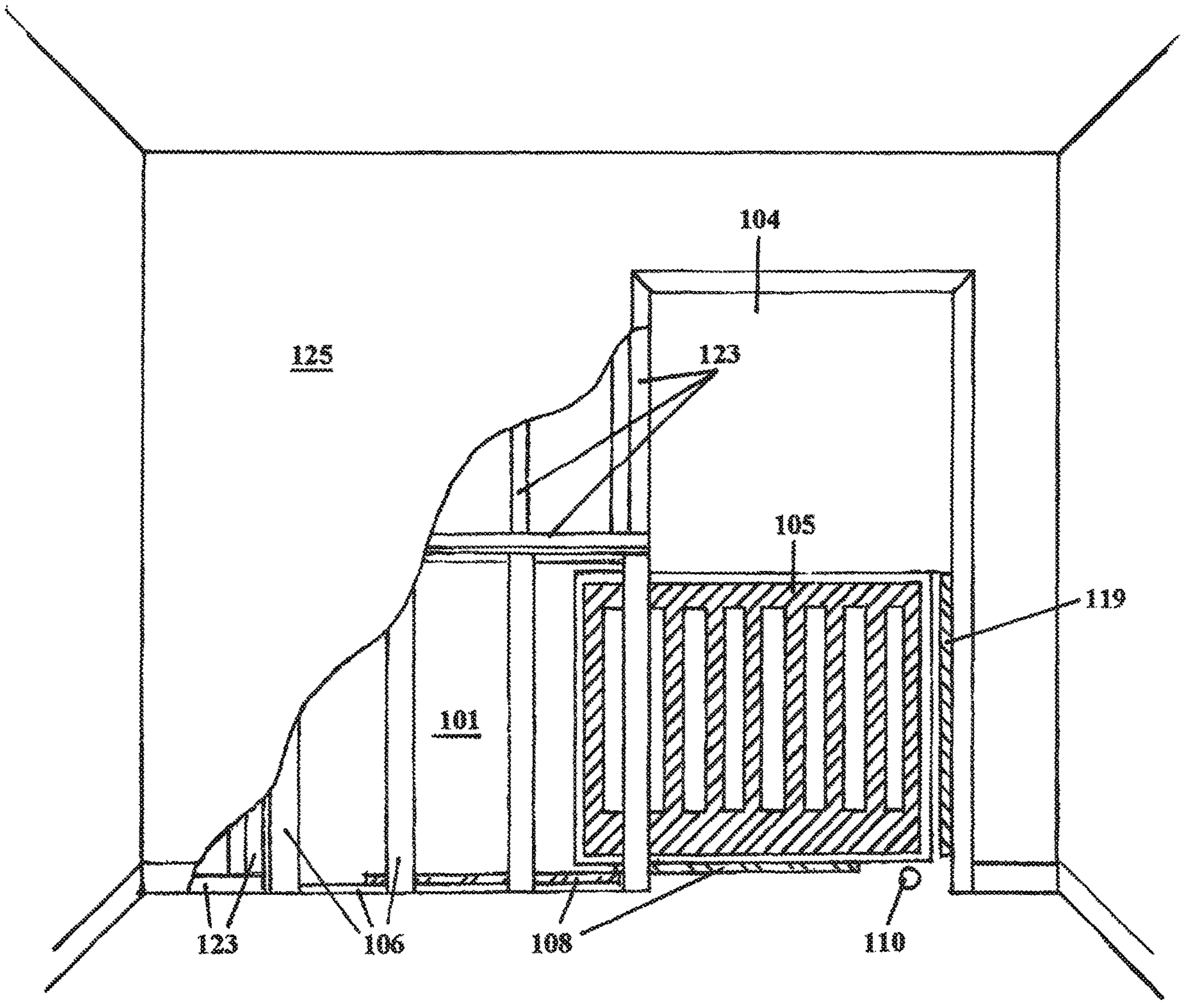
FIG. 7 shows an elevation view of a residential or business wall with the pocket sliding security gate installed in the wall next to an opening and part of the dry wall cut away so one can see the invention in the wall and in the closed position.

FIG. 7 illustrates an elevation view just like FIG. 6, except this view shows the sliding security gate 105 in the closed position, pulled out of the wood pocket frame 101 and in contact with the lock and alarm receiver 119.

Figure 8:
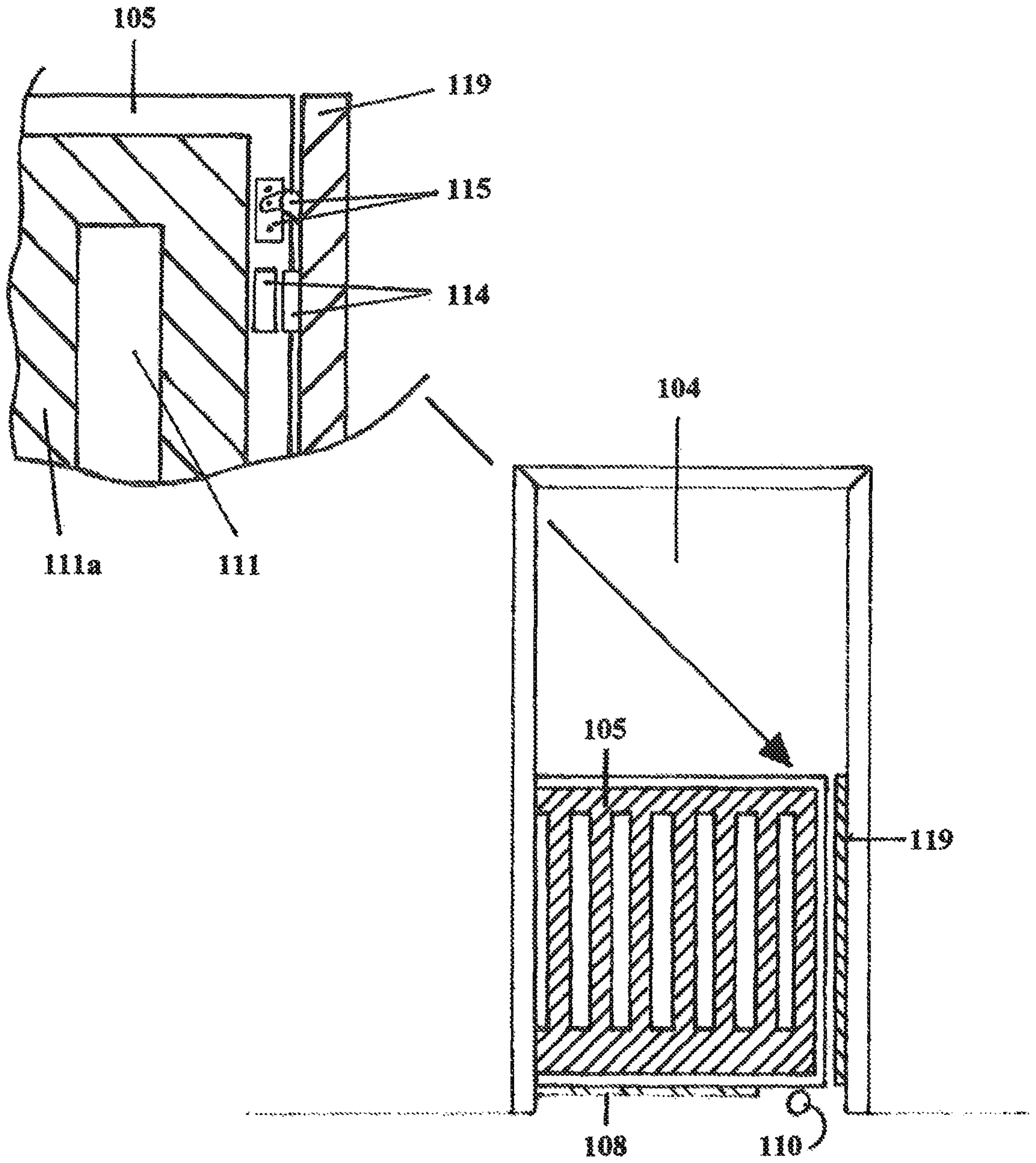
FIG. 8 shows an enlarged partial elevation view of the pocket sliding security gate in the closed position against the lock and alarm receiver.

FIG. 8 illustrates the pocket sliding security gate 121 installed in a wall and in the closed position across a pass-through opening 104 and against the lock and alarm receiver 119. Also shown is a partial enlarged view indicating the location of the right-angle latch 115 and the battery-operated alarm 114 and how one half of the right-angle latch 115 is attached to the sliding security gate 105 and the other half is attached to the lock and alarm receiver 119. The battery-operated alarm 114 is also two parts: one part attaches to the sliding security gate 105; the other part is attached to the lock and alarm receiver 119.

Figure 9:
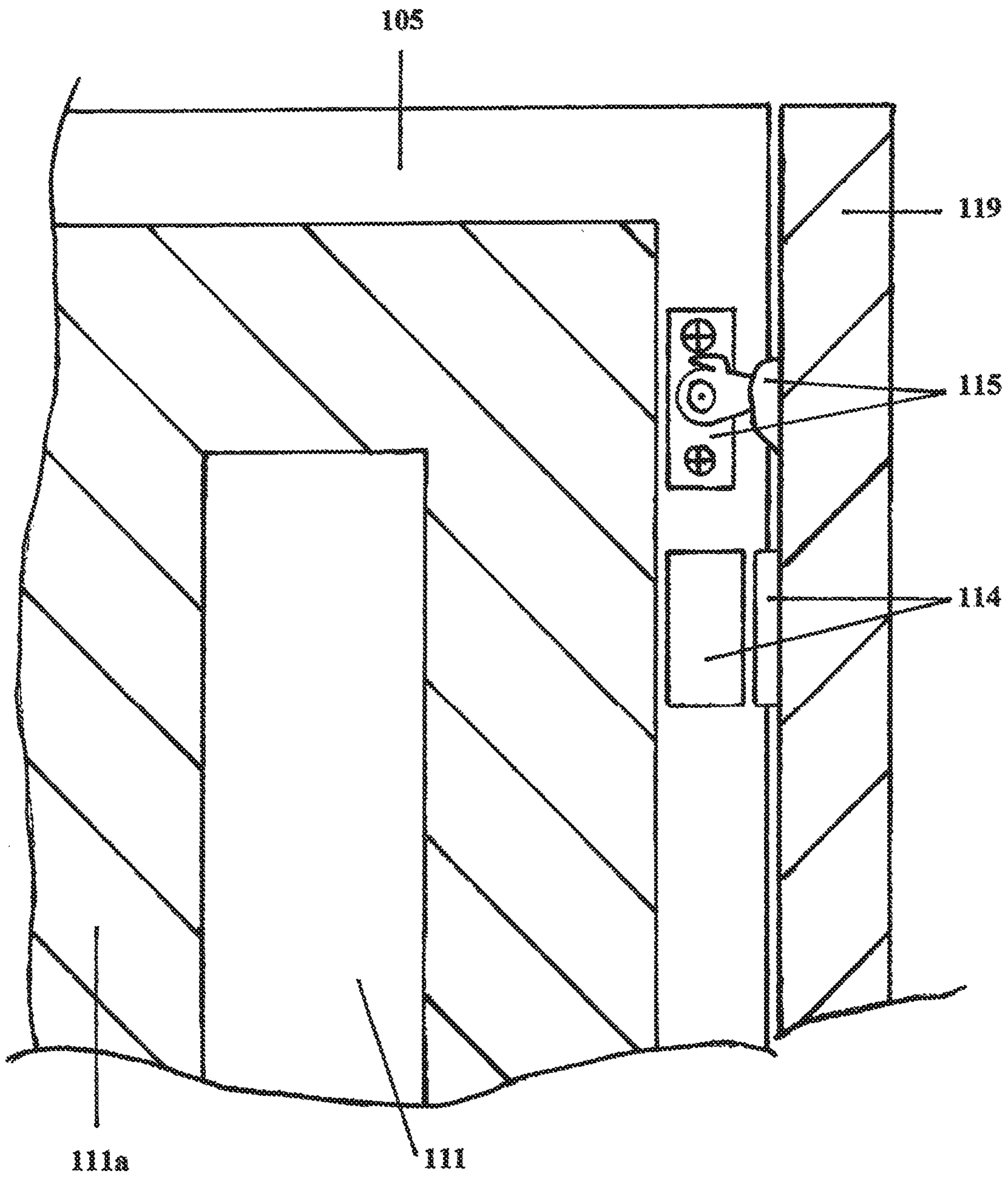
FIG. 9 shows a furthered enlarged partial elevation view of the pocket sliding security gate in the closed position against the lock and alarm receiver to illustrate more detail.

FIG. 9 illustrates an enlarged partial view of the area of the sliding security gate 105 and the lock and alarm receiver 119 where the right-angle latch 115 and the battery-operated alarm 114 are attached.

The disclosed embodiments have been described in full details of the structure and features of this invention, which comprises of a security gate apparatus that is housed inside a framed pocket unit that is intended for the use of a safety gate that can open and close across the door opening. Several examples have been described that have been referenced to various disclosed embodiments. These embodiments are for the illustration purposes and are not limited in nature. This invention should not be limited to the design of the Pocket Sliding Security Gate and is not limited to the particular embodiments that are disclosed herein. It is however, intended to cover all modifications, changes, and adaptations within the scope of this present invention as is defined by the appended claim.

What is claimed is:

1. A sliding security gate together with a wood pocket frame used to secure an opening and a passageway for the protection of children, pets, and disabled elderly comprising:

a two-tier ball-bearing cabinet drawer slide mounted to a bottom underside of said sliding security gate allows said sliding security gate the ability to move from a closed position to an open position guided by said two-tier ball-bearing cabinet drawer slide inside said wood pocket frame;

said sliding security gate further comprising; a dolly-style wheel mounted to a bottom underside of a leading end of said sliding security gate, which provides support to said leading end of said sliding security gate while sliding from the open position to the closed position; said dolly-style wheel must be removed to access and adjust a shim-pack system positioned within said sliding security gate; once adjustments have been made to said shim-pack system, said dolly-style wheel must be reinstalled for said sliding security gate to operate properly; adding or removing a shim or shimms from said shim-pack system will allow said sliding security gate to function with different thicknesses of flooring; thicker flooring needs less shimms and thinner flooring needs more shimms to keep said sliding security gate level; said shim-pack system is located between said dolly-style wheel and said bottom underside of said leading end of said sliding security gate;

said sliding security gate further comprising a top and a bottom horizontal member and a right and a left vertical member; said horizontal members fastened together with said vertical members with 90 degree connections at ends of said horizontal and said vertical members forming a rectangle-shaped frame, wherein said top and said bottom horizontal members are longer than a height of said right and said left vertical members creating a perimeter frame of said sliding security gate;

said sliding security gate further comprising vertical slats equally spaced inside said perimeter frame of said sliding security gate for providing security; said vertical slats equally spaced creates openings between said vertical slats;

said sliding security gate further comprising said wood pocket frame where said sliding security gate is stored when not in use; said wood pocket frame can be constructed of a substantially 1 inch by 3 inch dimensional lumber configured in a building process that creates a pocket inside of said wood pocket frame; an outer surface of said wood pocket frame is used to attach dry wall or other types of finish wall covering; said sliding security gate is incorporated together with said wood pocket frame which allows said sliding security gate to be installed in various locations throughout a home or business during new construction or remodeling or even as a single improvement or upgrade to an existing structure; said sliding security gate can be manufactured to fit any size opening; said wood pocket frame can be manufactured or altered to fit various wall widths as necessary to align with surrounding wall framing;

said sliding security gate further comprising a right-angle latch that has two parts, one part is attached to said leading end of said sliding security gate and the other part is attached to a lock and alarm receiver;

said sliding security gate further comprising a battery-operated alarm that has two parts, one part is attached to said leading end of said sliding security gate and the other part of the battery-operated alarm is attached to said lock and alarm receiver; said sliding security gate when in the closed position, which places said sliding security gate against said lock and alarm receiver, can be secured with said right-angle latch and said battery-operated alarm can be activated.

* * * * *